S. STEIN.

BURIAL CASKETS.

Reissued Sept. 12, 1876.

No. 7,309.

Witnesses.

R. E. White

Jacob Graber

Inventor.

Saml Stein,

By R. F. Osgood,

Atty.

N. PETERS, PHOTO-LITHOGRAPHER, WASHINGTON, D. C.

UNITED STATES PATENT OFFICE.

SAMUEL STEIN, OF ROCHESTER, NEW YORK.

IMPROVEMENT IN BURIAL-CASKETS.

Specification forming part of Letters Patent No. 132,605, dated October 29, 1872; reissue No. 7,309, dated September 12, 1876; application filed August 2, 1876.

*To all whom it may concern:*

Be it known that I, SAMUEL STEIN, of the city of Rochester, in the county of Monroe and State of New York, have invented a certain Improvement in Burial-Caskets, of which the following is a specification:

My invention consists of a skeleton frame formed of ornamental moldings and an interior box combined together, and secured by screws or nails passing through the sides of the box into the moldings, as hereinafter described.

Figure 1:
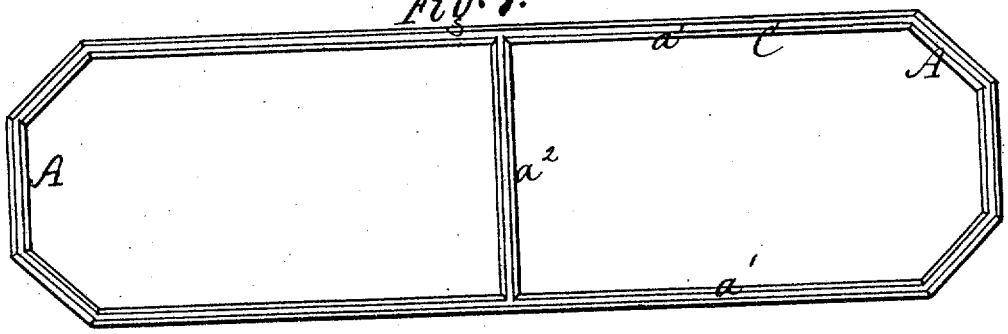
Figure 2:
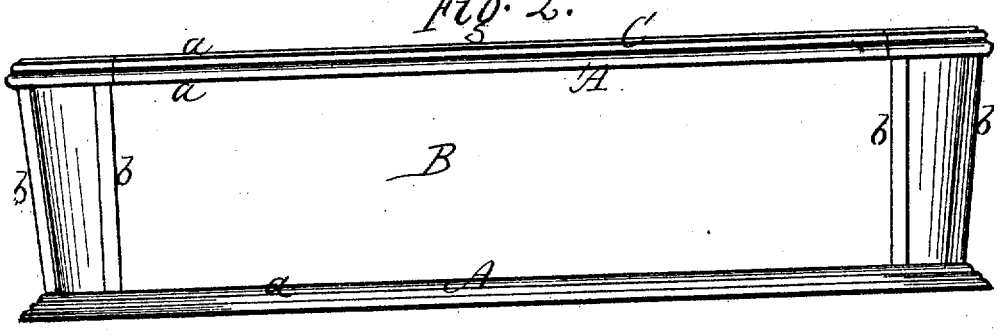
Figure 3:
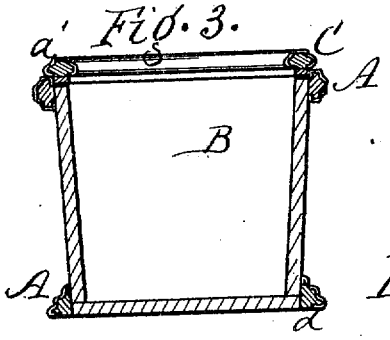
Figure 5:
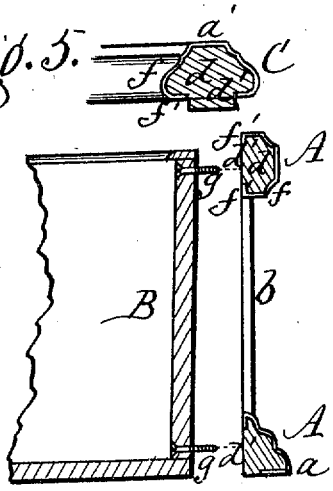
Figure 4:
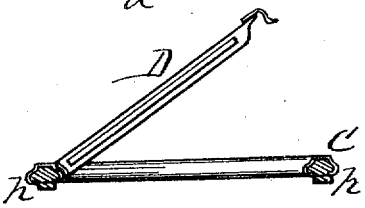

In the drawings, Figure 1 is a plan; Fig. 2, an elevation; Fig. 3, a cross-section; Fig. 4, an enlarged section of one side, with the parts separated; Fig. 5, a diagram showing the supplementary hinged lid.

A represents the skeleton frame, and B the interior box. The frame consists of ornamental moldings *a a* extending all around at top and bottom, and united at the several corners by vertical standards *b b*. The cover or lid C also has similar marginal moldings $a^1$, with a central cross-molding, $a^2$, in the upper section of which may be fitted a glass plate. This section may also have a supplementary lid, D, hinged on one side so as to turn up, as indicated in Fig. 4. The moldings constituting the skeleton frame are constructed in a peculiar manner for the attachment of the interior box. In the first place I prepare strips *d*, of wood or any other desired material, of proper form. I then run these strips, with covering-plates *f*, of sheet metal, (preferably silver-plated,) through dies, which fit the metal closely to the form of the moldings, with the edges *f′ f′* turned around the edges of the strips to clasp them in place, but having the center *d′* of the strips open for the insertion of the screws from the box. The box may be made of wood or other material, and it is formed entire before being placed in the skeleton frame. Its exterior may be covered by fabric of any kind, such as velvet; or it may be made plain, or ornamented in any desired manner. When placed in the skeleton frame it is secured to the latter by screws or nails *g g*, which pass through the sides and strike into that portion *d′* of the moldings which is left open for the purpose. The whole is thus made solid and substantial. The top of the box does not reach quite to the top of the moldings, but leaves a seat for the flange *h* of the lid to strike into. This flange is secured to the molding of the cover by screws or nails in the same manner that the box is secured to the moldings of the casket.

By this construction the labor and cost are greatly reduced and a highly ornamental casket is produced. The exterior appearance is improved by the moldings all around, which, if finished in silver, give a strong contrast to the background. The case made in this way is much stronger than if the moldings are simply secured piece by piece to the box, as in the old style. In this form the whole is compact and solid.

I contemplate, in some instances, making the moldings without the covering-plates of metal; but in any case the box is made entire before insertion in the skeleton frame, and the method of attachment is the same, by screws or nails through the box and moldings.

What I claim, and desire to secure by Letters Patent, is—

1. A burial-casket consisting of a box or receptacle, having metal-covered molding extending around its marginal edges, secured by screws or nails passing from the interior of the box into the uncovered portions of the moldings, as shown and described, and for the purpose specified.

2. A burial-casket consisting of an exterior skeleton frame, A, made of metal-covered moldings, in combination with interior box B, fitting within said frame and secured by screws or nails, as herein described.

In witness whereof I have hereunto signed my name in the presence of two subscribing witnesses.

SAMUEL STEIN.

Witnesses:

LEO STEIN,

R. F. OSGOOD.